United States Patent
Goering et al.

(10) Patent No.: US 10,219,436 B2
(45) Date of Patent: Mar. 5, 2019

(54) INDEPENDENT DRUM DRIVE SYSTEM FOR A COTTON HARVESTER ROW UNIT

(71) Applicant: DEERE & COMPANY, Moline, IL (US)

(72) Inventors: Kevin J. Goering, Cambridge, IA (US);
Joel M. Schreiner, Ankeny, IA (US);
John N. Oenick, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 102 days.

(21) Appl. No.: 15/281,153

(22) Filed: Sep. 30, 2016

(65) Prior Publication Data

US 2018/0092303 A1  Apr. 5, 2018

(51) Int. Cl.
*A01D 46/08* (2006.01)
*A01D 69/02* (2006.01)

(52) U.S. Cl.
CPC ......... *A01D 46/085* (2013.01); *A01D 46/081* (2013.01); *A01D 69/025* (2013.01)

(58) Field of Classification Search
CPC ...... A01D 46/085; A01D 69/02; A01D 46/18; A01D 2101/00
USPC ......................................................... 701/50
See application file for complete search history.

(56) References Cited

U.S. PATENT DOCUMENTS

| | | | | |
|---|---|---|---|---|
| 3,116,584 A | * | 1/1964 | Hubbard | A01D 46/08 56/44 |
| 3,439,788 A | * | 4/1969 | Fergason | F16D 21/02 192/48.6 |
| 3,999,359 A | * | 12/1976 | Jordan | A01D 45/16 460/150 |
| 4,866,918 A | * | 9/1989 | Engelstad | A01D 75/182 56/10.3 |
| 4,896,491 A | | 1/1990 | Warnsholz et al. | |
| 5,038,552 A | * | 8/1991 | Thedford | A01D 46/18 192/56.1 |
| 5,099,635 A | * | 3/1992 | Butkovich | A01D 46/08 56/13.5 |
| 5,247,786 A | * | 9/1993 | Schreiner | A01D 46/14 56/41 |
| 5,325,656 A | | 7/1994 | Schreiner et al. | |
| 7,386,380 B2 | | 6/2008 | Bares et al. | |
| 8,006,472 B1 | | 8/2011 | Schreiner et al. | |
| 8,074,433 B2 | | 12/2011 | Sheidler et al. | |
| 8,572,941 B1 | | 11/2013 | Schreiner | |
| 2002/0056262 A1 | | 5/2002 | Favache | |
| 2008/0046154 A1 | * | 2/2008 | Bares | A01D 46/085 701/50 |

(Continued)

*Primary Examiner* — Arpad Fabian-Kovacs
(74) *Attorney, Agent, or Firm* — Taft Stettinius & Hollister LLP; Stephen F. Rost

(57) ABSTRACT

A picking unit of a cotton harvester row unit includes a drum rotatable about an axis and a plurality of spindles for harvesting cotton. The plurality of spindles is coupled to the drum. A first drive unit rotatably drives the plurality of spindles. A second drive unit produces electrical power to drive a drive shaft. An output gear is coupled to the drive shaft, and a drum drive gear is coupled to the output gear. The drum drive gear rotatably drives the drum such that the output gear operably transfers power from the drive shaft to the drum drive gear. The drum is operably controlled independently of the plurality of spindles.

5 Claims, 5 Drawing Sheets

(56) References Cited

U.S. PATENT DOCUMENTS

| | | |
|---|---|---|
| 2009/0233664 A1 | 9/2009 | Sheidler et al. |
| 2010/0150692 A1* | 6/2010 | Digman ............... A01D 46/084 |
| | | 414/518 |
| 2011/0174171 A1* | 7/2011 | Viaud ................. A01F 15/0705 |
| | | 100/76 |
| 2018/0084725 A1* | 3/2018 | Ostermeier ............ A01D 69/02 |

* cited by examiner

INDEPENDENT DRUM DRIVE SYSTEM FOR A COTTON HARVESTER ROW UNIT

FIELD OF THE DISCLOSURE

The present disclosure relates to a drum drive system, and in particular, to an independently controlled drum drive system of a cotton harvester row unit.

BACKGROUND OF THE DISCLOSURE

Cotton harvester row units include a number of picking units for harvesting cotton. Each picking unit includes at least one drum, and on some units there may be a front drum and a rear drum. In any event, on each drum there is a number of picker bars and on each picker bar there are a plurality of spindles. Each spindle can be tapered and have a barbed surface for removing the cotton from the cotton plant. Each row unit includes a doffer column having a plurality of doffers for removing picked cotton from the spindles. A doffer is a disc that may be coated in rubber or urethane and rotatably driven at a velocity much greater than that of the spindles. In a conventional cotton harvester row unit, the spindles move underneath the bottom face of the doffers so that the cotton is unwrapped and stripped from the spindles.

In a conventional cotton picker row unit, there is a single gearbox input for rotatably driving all of the components of the row unit (i.e., the drum, spindles and doffers). During operation, drum speed is synched with the ground speed of the machine such that as the machine speed increases, the drum speed increases and vice versa. In many applications, the relationship between ground speed and drum is linear. Speed sensors and the like detect or measure ground speed of the machine, and the single gearbox input is controlled accordingly so that drum speed is synched to the ground speed. In doing so, the drum rotates when the machine is moving, and the drum is held from rotating when the machine is idle. Likewise, as the drum is rotatably driven, the spindles and doffers are also driven in a similar manner.

In this conventional system, however, the spindle speed is operably controlled in accordance with drum speed. Thus, as the drum speed decreases to match ground speed of the machine, the spindle speed also decreases. When the spindle speed decreases, the picking efficiency of the spindles is effectively reduced. For certain applications, e.g., a low yielding application, an operator may desire to increase ground speed above a certain limit, but doing so may cause the spindle speed to exceed a threshold limit. In a high yielding application, however, the operator may desire to operate at a lower ground speed without reducing spindle speed. In conventional drive systems, this is not possible since there is a single gearbox input driving the drum and spindles together. Thus, there is a need in certain applications to be able to operably control drum speed and spindle speed independently from one another.

SUMMARY

In one embodiment of the present disclosure, a picking unit of a cotton harvester row unit includes a drum rotatable about an axis; a plurality of spindles for harvesting cotton, the plurality of spindles coupled to the drum; a first drive unit for rotatably driving the plurality of spindles; a second drive unit for producing electrical power; a drive shaft electrically driven by the second drive unit; an output gear coupled to the drive shaft; and a drum drive gear coupled to the output gear and rotatably driving the drum, where the output gear operably transfers power from the drive shaft to the drum drive gear; wherein, the drum is operably controlled independently of the plurality of spindles.

In one example of this embodiment, the picking unit may include a plurality of doffers rotatably driven by the first drive unit. In a second example, the second drive unit includes an inverter and an electric motor. In a third example, the inverter operably receives an input from the electric motor related to either torque or speed during a picking operation; the inverter operably compares the input to a torque limit threshold or a speed limit threshold; and the inverter detects a plugged or torque overload condition when the input exceeds the torque limit threshold or speed limit threshold.

In a fourth example, the picking unit may include a second drum rotatable about a second axis and spaced from the first drum, the second drum being rotatably driven by the second drive unit. In a fifth example, the second drum is mechanically coupled to the first drum. In a sixth example, the picking unit may include a second drum rotatable about a second axis and spaced from the first drum; a third drive unit for producing electrical power; a second drive shaft electrically driven by the third drive unit; a second output gear coupled to the second drive shaft; and a second drum drive gear coupled to the second output gear and rotatably driving the second drum, where the second output gear operably transfers power from the second drive shaft to the second drum drive gear; wherein, the second drum is operably controlled independently of the plurality of spindles.

In another embodiment of the present disclosure, a method of operably controlling a drum of a picking unit of a cotton harvester row unit includes providing a controller, an inverter in electrical communication with the controller, a drum, a plurality of spindles coupled to the drum, a plurality of doffers, a first drive unit, and a second drive unit; rotating the plurality of spindles and plurality of doffers with the first drive unit; controlling the second drive unit electrically with the inverter; rotatably driving the drum via the second drive unit; and operably controlling the drum independently of the plurality of spindles and plurality of doffers.

In one example of this embodiment, the method may include determining a ground speed of the cotton harvester row unit; sending a speed command by the controller to the inverter for controlling the drum to a drum speed based on the speed command; and synching the drum speed of the drum to the ground speed of the cotton harvester row unit. In a second example, the operably controlling step includes operably controlling the drum at a drum speed that is infinitely variable and independent of a speed at which the plurality of spindles are rotated at by the first drive unit.

In a third example, the method may include receiving a torque signal and a speed signal from the second drive unit; comparing the torque signal or speed signal to a threshold value; and detecting plugged cotton or foreign material in the picking unit when the torque signal or speed signal exceeds the threshold value. In a fourth example of this embodiment, the method may include shutting down electrical power between the inverter and the second drive unit; and communicating a warning to an operator of the cotton harvester when the torque signal or speed signal exceeds the threshold value. In a fifth example, the method may include comparing the torque signal or speed signal to a second threshold value, where the second threshold value is less than the first threshold value; and sending an alert to the operator of the cotton harvester row unit to reduce drum speed or torque before the shutting down step.

In a further embodiment of the present disclosure, a cotton harvester row unit includes an engine for producing mechanical power; a controller for controlling operation of the cotton harvester row unit; a plurality of picker units configured to harvest cotton, wherein each of the plurality of picker units includes a drum; a plurality of spindles rotatably coupled to the drum; a plurality of doffers configured to remove cotton from the plurality of spindles; and a first input and a second input; a drive unit operably coupled to the first input for rotatably driving the plurality of spindles and the plurality of doffers; and an electric drive operably coupled to the second input for rotatably driving the drum, where the electric drive comprises an inverter disposed in electrical communication with the controller and an electric motor; wherein the drum is operably controlled independently of the plurality of spindles and plurality of doffers.

In one example of this embodiment, there is no slip clutch located on the drums. In a second example, the plurality of picking units includes a first picking unit and a second picking unit, the first picking unit and the second picking unit each including the electric drive, where the electric drive includes a front electric drive and a rear electric drive, and the drum includes a front drum and a rear drum; further wherein, the front electric drive of the first and second picking units operably drives the respective front drum, and the rear electric drive of the first and second picking units operably drives the respective rear drum.

In a third example, the plurality of picking units comprises a first picking unit and a second picking unit; the drum of the first picking unit comprises a first front drum and a first rear drum; the drum of the second picking unit comprises a second front drum and a second rear drum; the electric drive of the first picking unit operably drives the first front drum and the first rear drum independently of the plurality of spindles; and the electric drive of the second picking unit operably drives the second front drum and the second rear drum independently of the plurality of spindles.

In another example of this disclosure, the first front drum and the first rear drum are coupled to one another via a first mechanical coupling; the second front drum and the second rear drum are coupled to one another via a second mechanical coupling; further wherein, the electric power for driving either the first front drum or the first rear drum from the electric drive of the first picking unit is transferred to the other drum via the first mechanical coupling, and the electric power for driving either the second front drum or the second rear drum from the electric drive of the second picking unit is transferred to the other drum via the second mechanical coupling.

In a further example of this embodiment, the plurality of picking units comprises a first picking unit and a second picking unit; the drum of the first picking unit comprises a first front drum and a first rear drum; the drum of the second picking unit comprises a second front drum and a second rear drum; and the electric drive operably drives the first front drum, the first rear drum, the second front drum, and the second rear drum independently of the plurality of spindles on the first and second picking units.

In yet a further example, the plurality of picking units comprises at least a first picking unit and a second picking unit; the electric drive comprises at least a first electric drive and a second electric drive, the first electric drive operably controlling a drum of the first picking unit and the second electric drive operably controlling a drum of the second picking unit; further wherein, during operation of the first picking unit and the second picking unit, the inverter of the first electric drive operably receives a first input from the electric motor of the first electric drive and compares the input to a torque limit, and the inverter of the second electric drive operably receives a second input from the electric motor of the second electric drive and compares the input to a torque limit; further wherein, the inverter of the first electric drive detects plugged cotton in the first picking unit if the first input exceeds the torque limit, and the inverter of the second electric drive detects plugged cotton in the second picking unit if the second input exceeds the torque limit; further wherein, if plugged cotton is detected in either picking unit, then electrical power is shut off between the inverters and electric motors of the first and second picking units.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
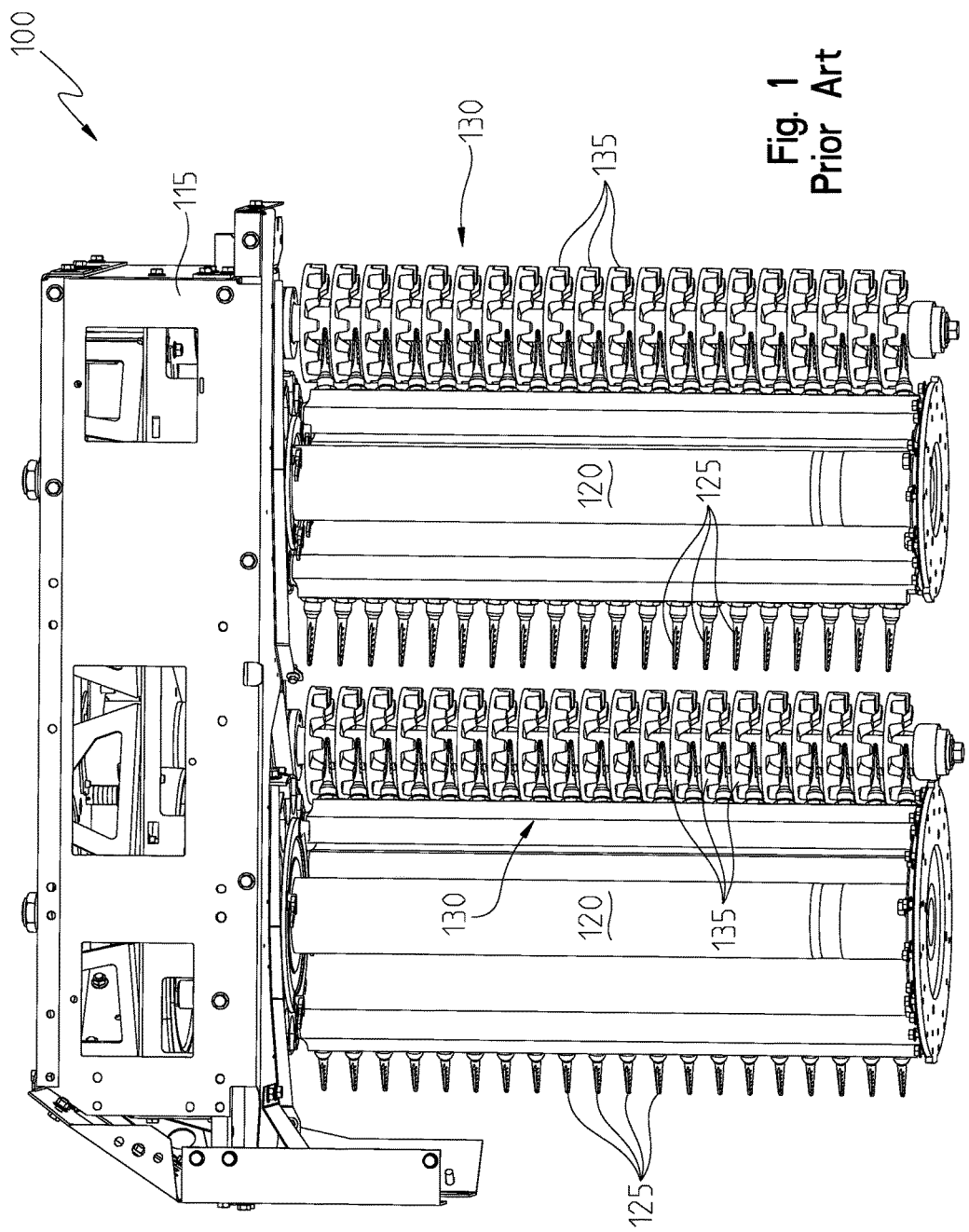
FIG. 1 is a perspective view of a portion of a conventional cotton harvester unit.
Figure 3:
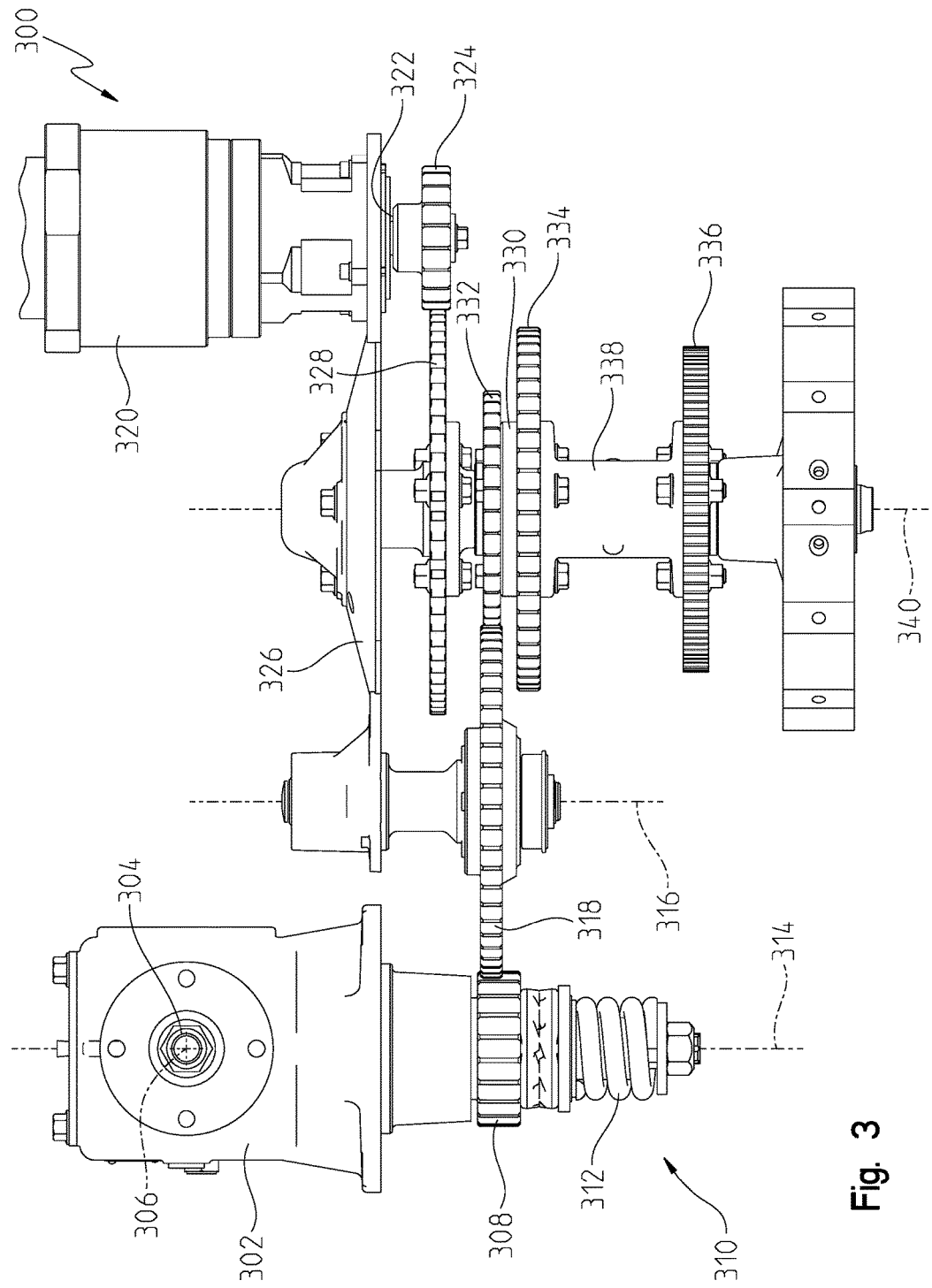
FIG. 3 is a side cross-sectional view of a portion of an independently controlled picker unit drive system.

Referring to FIG. 1, a conventional cotton harvester unit 100 is illustrated. The illustrated cotton harvester unit 100 may include a plurality of picking units. In FIG. 3, for example, the cotton harvester unit may include up to six different picking units. Other machines may include a different number of picking units. In any event, each unit may include a frame 115. A drum 120 is rotatably coupled to the frame 115. In at least one picking unit, there may be a front drum 120 and a rear drum 120. A plurality of rows of spindles 125 is rotatably coupled to each drum 120. A doffer column 130 having a plurality of doffers 135 is rotatably supported by a bearing housing (not shown). The plurality of doffers 135 is positioned adjacent the spindles 125 and configured to remove cotton from the spindles 125. The bearing housing (not shown) may be threadably engaged with a fixed housing (not shown), which is coupled to the frame 115.

In the conventional system of FIG. 1, power comes into a gearbox and transfers via an output shaft to an idler gear stack (not shown). The power is split between the drum and spindles. A gear connects the doffers to the spindles such that a relationship between the speeds of the doffers and spindles is maintained. In this system, the doffers and spindles are rotationally driven by the same drive system. An example of this is shown in FIG. 2.

Figure 2:
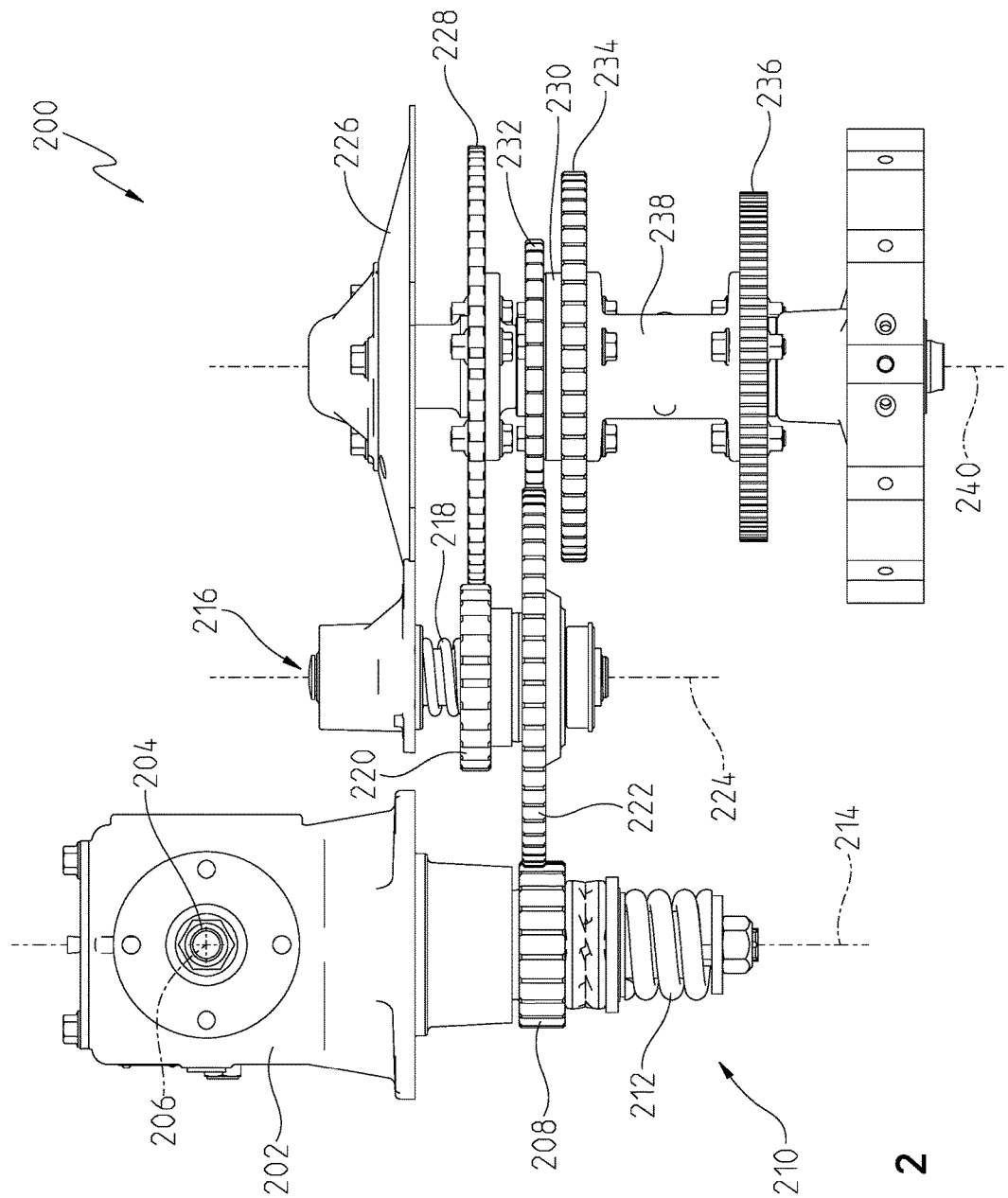
FIG. 2 is a side cross-sectional view of a portion of a conventional picker unit drive system.

Referring to FIG. 2, an example of a conventional row unit drive system 200 is illustrated. In this embodiment, the system includes an outer gear casing 202 that is oriented vertically about a first vertical axis 214. A horizontal input shaft 204 is coupled to the gear casing 202 along a horizontal axis 204, and input power is delivered via the shaft 204. In one example, the horizontal shaft 204 may be driven hydraulically via a hydraulic pump and motor. Although not shown, a 90° bevel gearset may be coupled to the input shaft 204 within the gear casing 202 to transfer the power from the shaft 204 to a single input gear 208. The input gear 208 represents the single power input to the conventional picking unit. As also shown, a gear case slip clutch assembly 210 may be disposed along the vertical axis 214 and coupled to the gear case 202 in any known manner. The gear case slip clutch assembly 210 may include a spring 212 for axially moving the input gear along the axis 214 based on various torque loads.

The input gear 208 may transfer power to a gear case idler assembly. The gear case idler assembly is vertically disposed about a second vertical axis 224, it includes a drum slip clutch assembly 216. The drum slip clutch assembly 216 is spring-loaded via a spring 218 and includes a set of slip clutch jaws (not shown) located between a first drive gear 220 and a second drive gear 222. If a torque overload or plugged condition occurs, the clutch slips such that the first drive gear 220 moves axially along the second vertical axis 224 on the slip clutch jaws. This prevents damage to the various components of the row unit when the unit is plugged or a torque spike is input into the unit.

The power from the input gear 208 is split into two power flow paths at the gear case idler assembly. The first power flow path is transferred via the first drive gear 220 to a drum driven gear 228, and the second power flow path is transferred via the second drive gear 222 to an output gear 232. The drum driven gear 228 transfers power to rotatably drive the one or more drums of the row unit. The gear 228 is coupled to another gear stack along a third vertical axis 240. The drum driven gear 228 is further coupled to a portion of the row unit frame or structure 226, as shown in FIG. 2.

The output gear 232 is also aligned axially along the third vertical axis 240. The output gear 232 is further coupled to a hub 230 and shaft 238 as shown in FIG. 2. Two additional gears are rotatably driven via the power transferred to the output gear 232, i.e., a doffer drive gear 234 and a spindle drive gear 236. Thus, all three gears rotate at the same speed. Although not shown in FIG. 2, the doffer drive gear 234 drives an idler gear, which in turn drives a doffer driven gear located on a doffer shaft. The plurality of doffers are then rotatably driven by the doffer driven gear and doffer shaft.

The spindle drive gear 236 operably drives the plurality of spindles for picking cotton. In the conventional drive system of FIG. 2, the drum drive gear 228 and spindle drive gear 236 are coupled to one another via the drum slip clutch assembly 216. In effect, the drum drive gear controls drum speed, and the spindle drive gear controls spindle speed. In this system, both drum speed and spindle speed are controlled via the same input, i.e., the input gear 208.

In FIG. 3, a different drive system for a row unit is shown. In this system 300, the aforementioned drum slip clutch assembly is removed. Moreover, while not shown in FIG. 2, speed sensors may also be removed. With the drum slip clutch assembly subject to wear over time and speed sensors often being a high warranty component, the embodiment of FIG. 3 offers a number of advantages over the conventional drive system of FIG. 2. These advantages will become more apparent based on the principles and teachings in this disclosure.

Referring to the embodiment of FIG. 3, a gear case 302 may be provided in which an input shaft 304 transfers power to the row unit drive system. The input shaft 304 may be horizontally oriented with respect to the gear case 302 along a horizontal axis 306. Similar to the embodiment of FIG. 2, a 90° bevel gearset located inside the gear case 302 may be coupled to the shaft 304 and transfer the power from the input shaft 304 to an input gear 308. The gear case 302 may include a gear case slip clutch assembly 310 with a spring 312. As shown, the gear case 302 and input gear 308 may be axially aligned along a first vertical axis 314.

The input gear 308 may be rotatably coupled to a drive gear 318 as shown in FIG. 3. The drive gear 318 is the only gear shown along a second vertical axis 316, and it is designed to transfer power to the spindles and doffers. As shown, the drive gear 318 is coupled to an output gear 332. The output gear 332 is rotatably coupled to a doffer drive gear 334 and a spindle drive gear 336 via a hub 330 and shaft 338. As the output gear 332 rotates, the doffer drive gear 334 and spindle drive gear 336 rotate at substantially the same speed. Moreover, each of these gears are vertically stacked or spaced relative to one another along a third vertical axis 340, as shown in FIG. 3.

Also disposed along the vertical axis 340 in FIG. 3 is a drum drive gear 328. The drum drive gear 328, however, is not rotatably driven by the input gear 308. Instead, a separate drive unit 320 may be provided for driving the drum drive gear 328. In this embodiment, an electric motor 320 is shown as the drive unit. In other embodiments, however, the drive unit may be a hydraulic motor or a mechanical drive system. In one example, the drum drive unit may be an independent infinitely variable drive system. In any event, the drive unit is a separate input to the row unit and provides power to drive the drum independently from the spindles. In other words, unlike conventional drive systems, the first input gear 220 of FIG. 2 is removed and drum speed is independent from spindle speed in the illustrated embodiment of FIG. 3. Moreover, the row unit has two inputs, i.e., the input gear 308 and the drive unit 320.

The drive unit 320, or electric motor, may include a drive shaft 322 that rotatably drives a second input gear 324. The second input gear 324 may be coupled or splined to the drum drive gear 328 in order to generate drum speed. In the embodiment of FIG. 3, the drive unit 320 operably drives the drum drive gear 328. In other embodiments, the drive unit 320 may drive two or more drums. In those embodiments, the size of the drive unit 320 may be customized to deliver the requisite amount of power to each drum.

In one example, the drive unit 320 may operably drive a front drum and a rear drum of a picking unit. In this example, the front and rear drums may be mechanically coupled to one another via a belt, chain, gearing, or other mechanical coupling device. In a second example, a single drive unit may operably drive one or more drums on two or more picking units. In this example, there may be three picking units each having a front and a rear drum. Here, the single drive unit may operable drive all six drums. The drive unit may be directly coupled to one of the drums, and then the other five drums may be mechanically coupled to one another. In an embodiment in which a single drive unit is operably driving two or more drums, a slip clutch or the like may be disposed on a drum drive shaft and incorporated with the drum drive gear to protect the drum drive components in case of a plug or excessive load. On the contrary, when there is a single drive unit per drum, the slip clutch can be removed from the drum and is unnecessary because torque and speed can be controlled by the drive unit 320 (particularly when the drive unit is an electric motor).

In an alternative embodiment, the drum drive input may be integrated in the location of the drum slip clutch assembly 216 in FIG. 2. Although an illustrated embodiment of this is not provided, an electric motor may electrically power a motor shaft which drives a planetary gearset. For instance, a sun gear of the planetary gearset may be coupled to the shaft, and power may be transferred from the sun gear to a carrier member rotatably supporting one or more pinion gears. A ring gear of the planetary gearset may be fixedly mounted to a motor housing or frame of the row unit. The carrier member may operably drive a drum drive gear similar to the drum drive gear 328 in FIG. 3. The motor shaft, planetary gearset, drum drive gear, and a drive gear similar to the drive gear 318 in FIG. 3 may be coaxially aligned along the second vertical axis 316. In this alternative embodiment, however, the motor rotatably drives the drum drive gear, but does not power the separate drive gear. The drive gear 328, similar to the one shown in FIG. 3, may be driven by the input gear 308 as described above.

In the above described embodiments in which the drum drive is separate from the spindle drive, the use of an electric motor allows for independent control for different applications. Whether the application is a high or low yield, the drum speed can be synched with ground speed and the spindles may be operably driven at a desired speed to achieve efficient picking. For example, a controller may command motor speed based on a detected ground speed of the cotton harvester row unit. Drum speed may be operably controlled up to a maximum drum speed limit, and this may still be achieved via a linear relationship with ground speed. Spindle speed, however, may be controlled differently. For example, it may be desirable to achieve maximum spindle speed at different drum speeds.

In one example, a machine operator may have a user control located within a cab of the machine to control spindle speed. For instance, the operator may desire a certain maximum spindle speed, and from the cab, be able to control the speed to such. In another example, the operator may be able to set maximum spindle speed at a certain ground speed. Thus, when the machine reaches a certain ground speed (e.g., 3 mph), the spindles may be driven at their respective maximum speed. Again, this is independent of drum speed since the one or more drums of a given row unit are controlled by a separate drive unit (e.g., electric or hydraulic motor).

As previously described, the independent drum drive system may be such that there is no drum slip clutch. If there is a plug in the row unit, motor torque or speed may be monitored, and if the torque or speed reaches a threshold limit, a controller may shut off power to the motor. Moreover, an alarm may be triggered or an alert communicated to the operator about the plugged condition. The same may be true if an excessive torque load is detected. The electric motor may be controlled by an inverter or controller to limit the amount of torque transferred to the drums to prevent any damage to the drum or other row unit components.

As described, when cotton plugs the inverter may detect an increase in current needed to drive the motor or a decrease in motor speed. The inverter may take the form of an inverter controller and function both as a controller for controlling the motor operation and inverting current into a three-phase. By controlling the motor, the inverter may receive inputs from the motor and compare the inputs to threshold values to determine a plugged condition. As will be described below, the inverter may be electrically coupled to a Controller Area Network (CAN bus) for communicating with other controllers. In this manner, other controllers may detect the plugged condition based on information communicated over the CAN by the inverter.

In addition to triggering an alert or alarm, the independent drum drive system allows for plug or excessive torque load detection. The drive system can monitor current draw to the electric motor, and from speed and power the amount of torque may be determined. Moreover, a command may be sent to control motor speed and torque. For example, a controller may control the motor to a maximum speed while torque is continuously monitored. Alternatively, the controller may command the motor to a certain torque.

In any event, during operation, a controller may monitor torque and compare the torque to a torque threshold or limit. This threshold or limit may be set such that it is reached only if a plug condition or excessive load or obstruction occurs. Thus, if the controller detects a torque that exceeds the maximum predetermined torque limit, a plug or excessive load is detected. The electric motor may be shut down and an alert sent to the operator. In some instances, a pre-warning may be communicated to the operator when the torque reaches a second threshold which is less than the maximum predetermined torque limit. This pre-warning may notify the operator to reduce torque or speed before power is cut to the motor.

If a plugged condition is detected, the operator may command the electric motor to operably drive the motor in an alternating manner between a forward and reverse direction in an effort to clear the plug. In many conventional applications, an operator may have to manually remove the plugged cotton from the row unit, whereas in the present disclosure an application is provided in which the operator can control the drive unit to clear the plugged cotton.

For purposes of this disclosure, an electric drive system is only one of several embodiments contemplated herein. An independently controlled hydraulic drum drive system is also possible. In this embodiment, hydraulic pressure may be measured to detect a plugged condition or excessive load, and the pressure may be compared to a pressure threshold. With a hydraulic system, load and speed sensing may be executed by pressure and speed sensors, respectively.

Moreover, an independent mechanical drum drive system is also possible. Here, power shafts may transfer power from a centralized or main drive system. A gear case may then transfer the mechanical power to the row units. Other means may be possible including gears, for example.

Figure 4:
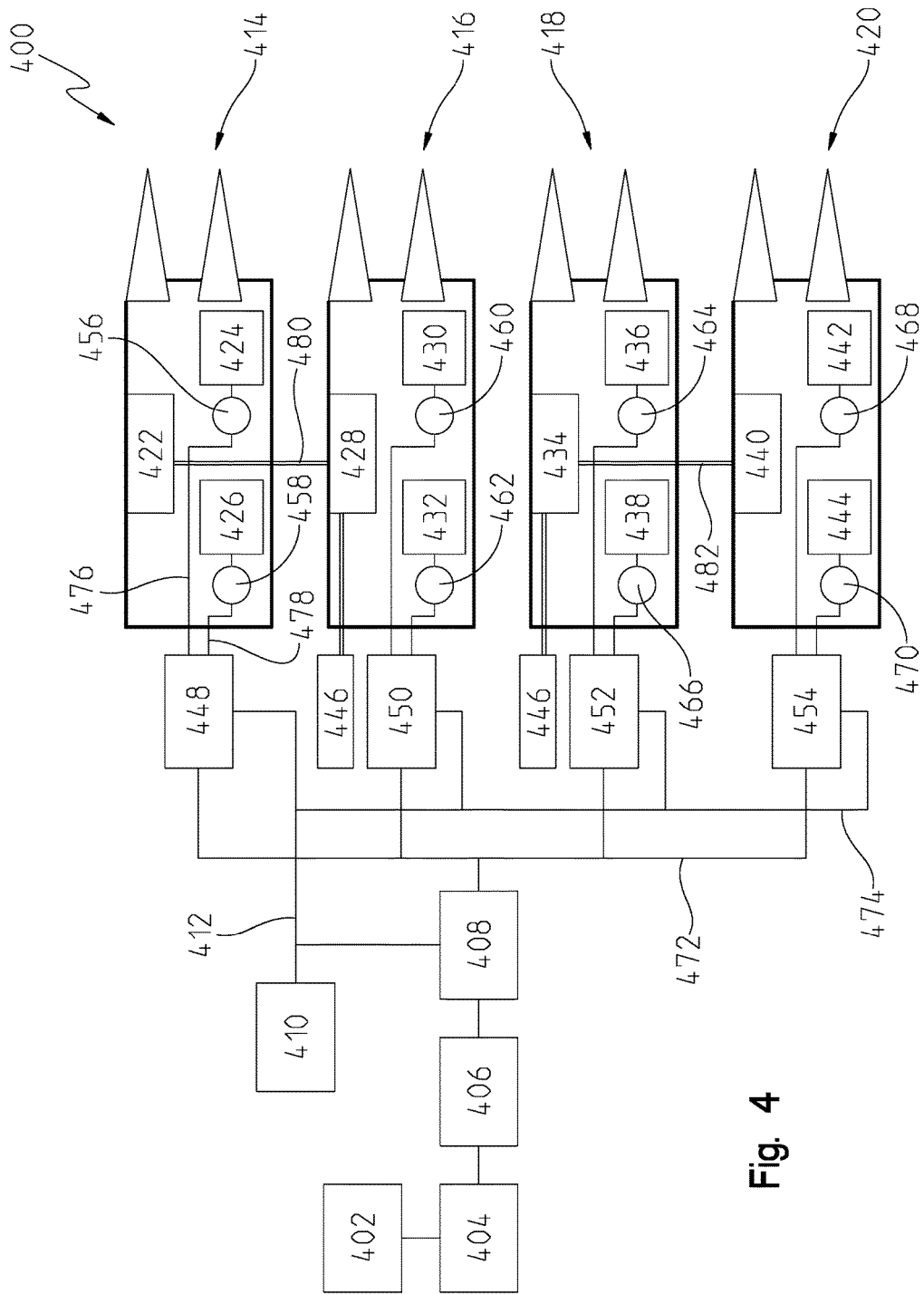
FIG. 4 is a control schematic of a first embodiment of an independent drum drive system.

Referring now to FIG. 4, a first embodiment of a control system 400 for controlling an independent drum drive system of a cotton harvester row unit is shown. The row unit may include a main drive unit such as an engine 402. The engine 402 may be an internal combustion engine or any known type of engine capable of producing mechanical power that drives a gearbox 404, transmission unit, auxiliary drive unit, etc. The gearbox or transmission unit 404 may be a continuously variable or an infinitely variable device. Alternatively, it may be a device capable of producing various gear or speed ratios. In any event, the mechanical power from the engine 402 may be converted to electrical power via a generator or alternator unit 406. In one example, the unit 406 may be an alternator with a rectifier. Various electronics 408 may allow for voltage control to control a plurality of different picking units, which will be described below. In an alternative embodiment, the electronics 408 may include an inverter capable of converting electrical power to mechanical power from the generator unit 406 to provide backup power to the gearbox 404, cooling fans and other mechanically-driven devices of the row unit.

The control system 400 may include a controller 410 such as a head interface controller (HIC). The controller 410 may be in electrical communication with the generator or alternator unit 406 and electronics 408 via a communication network such as a CAN bus 412. The controller 410 may communicate to or receive voltage commands from the electronics 408. In any event, electrical power may be supplied to the plurality of picking units as shown in FIG. 4.

In the illustrated embodiment of FIG. 4, the cotton harvester row unit may include four picking units, namely, a first picking unit 414, a second picking unit 416, a third picking unit 418, and a fourth picking unit 420. In another embodiment, however, there may be six picking units. In a further embodiment, there may be two picking units. The present disclosure is not limited to any number of picking units, and thus the independent drum drive system may be incorporated into any number of picking units based on the teachings of the present disclosure.

Each picking unit may include a spindle and doffer drive and a front and rear drum drive. Alternatively, each picking unit may only include a single drum. As described above with reference to FIG. 3, each picking unit may include one input for driving the one or more drums and a second input for driving the spindles and doffers. In the illustrated embodiment of FIG. 4, each picking unit may include a front drum and a rear drum. In this example, a plurality of spindles may be rotatably driven by the front drum and a plurality of spindles may be rotatably driven by the rear drum. In any event, the front drum drive and rear drum drive may be independent from the spindle and doffer drive.

Figure 5:
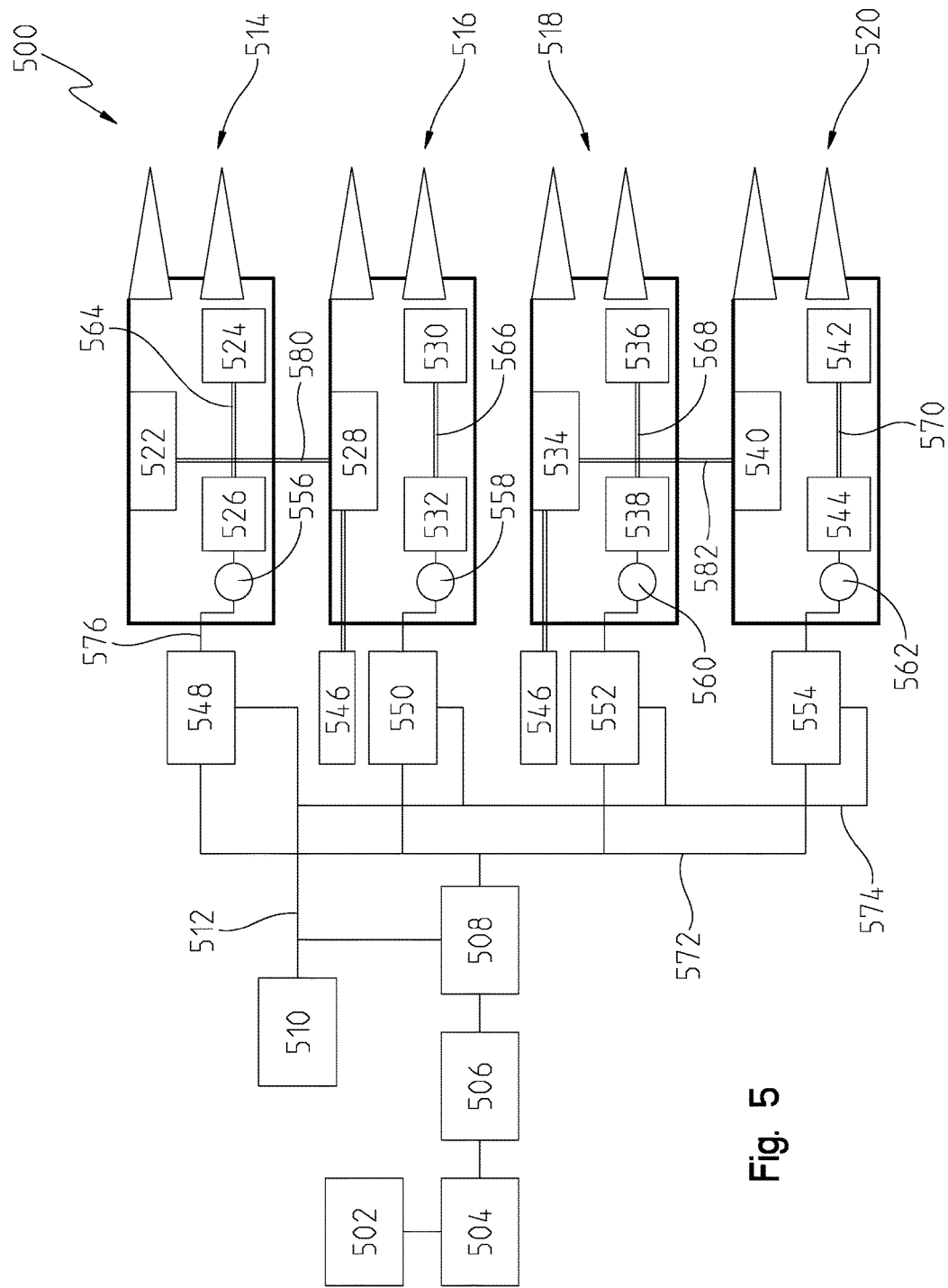
FIG. 5 is a control schematic of a second embodiment of an independent drum drive system.

In FIG. 4, for example, the first picking unit 414 may include a spindle and doffer assembly 422, a front drum assembly 424, and a rear drum assembly 426. For purposes of orientation, "front" is intended to mean towards a front end of the picking unit and "rear" is intended to mean towards a rear end of the picking unit. Moreover, for purposes of this disclosure, "drum drive" may also be referred to as "drum assembly" and vice versa. The drum drive or drum assembly may include the drum and various gears (such as those shown in FIG. 3) or other structure required to drive the drum. As will be described below, the drum assembly is separate from the drum drive unit, which in FIGS. 4-5 is shown as an electric motor but which may also be a hydraulic motor or mechanical drive unit. The spindle and doffer assembly may include the different gears, hubs and shafts along with the plurality of spindles and doffers.

The second picking unit 416 may include a spindle and doffer assembly 428, a front drum assembly 430, and a rear drum assembly 432. Likewise, the third picking unit 418 may include a spindle and doffer assembly 434, a front drum assembly 436, and a rear drum assembly 438. Further, the fourth picking unit 420 may include a fourth spindle and doffer assembly 440, a front drum assembly 442, and a rear drum assembly 444.

As in harvester row unit of FIG. 3, each spindle and doffer assembly may be mechanically driven by a mechanical power unit 446. For instance, the engine 402 may provide mechanical power to a gear case which provides power to the spindle and doffer assembly. In FIG. 4, mechanical power 446 may be provided to the second spindle and doffer assembly 428, which is mechanically coupled to the first spindle and doffer assembly 422. As such, mechanical power 446 is transferred through a first flow path to the first and second spindle and doffer assemblies of the first and second picking units, respectively. Likewise, mechanical power 446 may be transferred through a second flow path to the third and fourth spindle and doffer assemblies of the third and fourth picking units, respectively. Thus, there is a mechanical coupling between the first and second picking units and the third and fourth picking units.

The spindle and doffer assembly may also be hydraulically driven by a hydraulic motor. For example, in the embodiment of FIG. 3, the horizontally input shaft 304 may be hydraulically driven by a hydraulic motor. In this example, the drive system of the spindle and doffer assembly may be controlled by the controller 410 with a closed loop, speed-controlled hydraulic pump.

In the embodiment of FIG. 4, the drum drive system is an electric drive system controlled by an inverter. The inverter may be a John Deere CA6 56 VDC inverter. In any event, the inverter may be in electrical communication with the controller 410 over the CAN bus 412. The controller 410 may detect or receive ground speed measurements from a speed sensor or other sensing device (not shown), and then communicate drum speed commands over the CAN bus 412 to the inverters for controlling the drum speed of each drum assembly. In a further embodiment, a CAN bridge may operably couple one or more inverters to the controller 410 to receive speed commands therefrom. In this manner, drum speed can be synched with ground speed via a linear relationship as described above. It is worth noting that while drum speed may be linearly synched with ground speed, the drum speed is independent of spindle speed. Thus, spindle speed may be variably controlled relative to ground and drum speed.

In FIG. 4, for example, the first picking unit 414 includes a first inverter 448. Similarly, the second picking 416 includes a second inverter 450, the third picking unit 418 includes a third inverter 452, and the fourth picking unit 420 includes a fourth inverter 454. Each inverter may function in a manner similar to that previously described. Moreover, each inverter may include dual outputs, or it may be a dual inverter each with individual outputs.

In the embodiment of FIG. 4, the front and rear drums may be electrically driven by its own electric motor. For example, in the first picking unit 414, the front drum 424 may be electrically powered by a first front motor 456 and the rear drum 426 may be electrically powered by a first rear motor 458. The first front motor 456 and first rear motor 458 may be in electrical communication with the first inverter 448. In one aspect, wires or cables may electrically couple each motor to the first inverter 448. In a different aspect, the inverter may wirelessly communicate with each motor.

Similar to the first picking unit, the second front drum 430 may be electrically powered by a second front motor 460. The second rear drum 432 may be electrically powered by a second rear motor 462. The front motor 460 and rear motor 462 may each be electrically coupled or at least in electrical communication with the second inverter 450. Electrical wires or cables may electrically couple the second inverter 450 to each of the second motors, or communication may be via wireless communication.

In the third picking unit 418, the third front drum 436 may be electrically driven by a third front motor 464, and the third rear drum 438 may be electrically driven by a third rear motor 466. In each case, the drums are electrically driven independently of the spindle and doffer assembly 434. The front and rear electric motors of the third picking unit 418 may be electrically coupled or at least in electrical communication with the third inverter 452. Electrical communication may be via cables or wires or wirelessly.

In the fourth picking unit 420, the fourth front drum 442 may be electrically powered by a fourth front motor 468. The fourth rear drum 444 may be electrically powered by a fourth rear motor 470. The front motor 468 and rear motor 470 may each be electrically coupled or at least in electrical communication with the fourth inverter 454. Electrical wires or cables may electrically couple the fourth inverter 454 to each of the motors, or communication may be via wireless communication.

In each picking unit, the respective inverter may be electrically coupled or in electrical communication via electrical communication line 472 with the generator unit 406 and electronics 408. Moreover, each inverter may be in communication with the controller 410 via the CAN bus 412 or any other communication line. The inverter of each picking unit may receive from or send commands via a command line 474 to the controller 410. These commands may relate to inputs received from each motor. Inputs may include torque, speed, temperature, etc.

In the embodiment of FIG. 4, the electric motors may be used to detect a plugged condition. For example, a plugged condition or overload condition may be detected based on a current request from the motor to the inverter, or torque or speed may be used as a determining factor. In any event, the inverter may be programmed to compare the torque or speed to a limiting threshold, and if the threshold is exceeded then a plugged or overload condition may be detected. Alternatively, the inverter may communicate the torque or speed to the controller 410 over the CAN bus 412 and the controller 410 may detect the plugged or overload condition.

In one example, the controller 410 may include a memory unit and processor. The memory unit may include storage for storing one or more algorithm, software programs, look-up tables, graphical data, threshold values, and the like. Here, the memory unit may store a first torque limit, a second torque limit, a first speed limit, and a second speed limit. If, during operation, either the first torque or speed limit is exceeded, the controller 410 may send an alert to the operator of the cotton harvester row unit that the torque or speed on a particular electric motor is reaching its upper limit. The operator may then take corrective action to reduce the torque or speed on the motor. If the second torque or speed limit is reached, the controller 410 may send another or different warning to the operator. In addition or alternatively, the controller 410 may send a signal to the inverter to shut down electrical power to the electric motor. In some embodiments, the same signal may be sent to each of the inverters to shut down all of the electric motors. This type of system allows for preventative maintenance and reduces potential damage to the various row unit components.

It is worth noting that in the embodiment of FIG. 4, there are no drum slip clutches in any of the row units. In this embodiment, the electric motors provide torque and speed data to the inverter or controller, and thus when a maximum or predetermined torque or speed limit is reached, power to the electric motor may be shut off to prevent possible damage. The torque limiting function of a slip clutch therefore is no longer required since electric motors are used to drive the drums. Moreover, speed sensors for measuring drum speed are no longer required because the electric motors can provide this data as well.

Thus, in the illustrated embodiment of FIG. 4, each front drum is electrically powered by a front electric motor, and each rear drum is electrically powered by a rear electric motor. Turning to FIG. 5, however, a related embodiment is provided in which the independent drums of a single picking unit are electrically powered by only one electric motor. For sake of simplicity, reference numbers are similar between the embodiments of FIGS. 4 and 5 as it relates to the different system components.

In FIG. 5, a control system 500 for a cotton harvester unit is illustrated. Similar to the control system 400 of FIG. 4, the control system 500 in FIG. 5 may include a controller 510. The cotton harvester row unit may include a drive unit such as an internal combustion engine 502 that provides mechanical power to a gearbox, transmission, or auxiliary drive unit 504. A generator unit 506 or alternator unit may convert the mechanical power to electrical power, and electronics 508 for voltage command may be in electrical communication with the controller 510. In one non-limiting example, the generator or alternator unit 506 may be a 56 VDC alternator with rectifier.

The harvester row unit may include a plurality of picking units. Similar to the embodiment of FIG. 4, the plurality of picking units in FIG. 5 may include a first picking 514, a second picking 516, a third picking unit 518, and a fourth picking 520. Each picking unit may include its own inverter that is disposed in electrical communication via an electrical line 572 to the generator unit 506 and electronics 508. Moreover, the controller 510 may communicate various speed commands and other instructions to each inverter via a CAN bus 512.

The first picking unit 514 may include a first inverter 548, a first spindle and doffer assembly 522, a first front drum 524 and a first rear drum 526. The second picking unit 516 may include a second inverter 550, a second spindle and doffer assembly 528, a second front drum 530, and a second rear drum 532. The first spindle and doffer assembly 522 may be mechanically coupled to the second spindle and doffer assembly 528, as shown in FIG. 5, via a mechanical coupling 580. Mechanical power 546, e.g., from the engine 502, may mechanically power the spindle and doffer assemblies. Alternatively, a hydraulic pump may provide hydraulic power to the second spindle and doffer assembly 528, and the second spindle and doffer assembly 528 may be mechanically coupled to the first spindle and doffer assembly 522 via a chain or belt.

The third picking unit 518 may include a third inverter 552, a third spindle and doffer assembly 534, a third front drum 536, and a third rear drum 538. The fourth picking unit 520 may include a fourth inverter 554, a fourth spindle and doffer assembly 540, a fourth front drum 542, and a fourth rear drum 544. The third spindle and doffer assembly 534 may be mechanically coupled to the fourth spindle and doffer assembly 540, as shown in FIG. 5, via a mechanical coupling 582. Mechanical power 546, e.g., from the engine 502, may mechanically power the spindle and doffer assemblies. Alternatively, a hydraulic pump may provide hydraulic power to the third spindle and doffer assembly 534, and the third spindle and doffer assembly 534 may be mechanically coupled to the fourth spindle and doffer assembly 540 via a chain or belt.

The control system 500 of FIG. 5 differs from that in FIG. 4 in that only a single electrical motor is provided for each picking unit. For example, the first front drum 524 and the first rear drum 526 are electrically powered by a single electrical motor 556. It is worth noting that the drums 524, 526 are electrically powered independently from the spindle and doffer assembly 522. In this example, however, the first motor 556 electrically powers both the first front drum 524 and the first rear drum 526. The same is true with respect to the other picking units. For example, a second electrical motor 558 electrically powers the second front drum 530 and the second rear drum 532. A third electrical motor 560 electrically powers the third front drum 536 and the third rear drum 538. Moreover, a fourth electrical motor 562 electrically powers the fourth front drum 542 and the fourth rear drum 544.

Each inverter may be electrically coupled or at least in electrical communication with each respective motor via electrical cables or wiring 576. The motor may send inputs to the inverter in the form of a current draw that is related to a load (e.g., torque), speed, temperature or other input. The inverter may send or receive commands via a command line 574 to another inverter or the controller 510. Alternatively, communication may be via the CAN bus 512. In any event, the same functionality and benefits may be achieved with the single motor per row unit system as shown in FIG. 5.

In the illustrated embodiment of FIG. 5, it is further shown that the front and rear drums may be mechanically coupled to one another. In other words, the electric motor may electrically power either the front or rear drum, and the other drum is mechanically coupled to the electrically driven drum. The mechanical coupling (e.g., cables, belts, chains, shafts, gears, etc.) allows a single electric motor to electrically power both drums simultaneously. In FIG. 5, for example, a first mechanical coupling 564 is provided between the first front drum assembly 524 and the first rear drum assembly 526. Here, the first rear drum assembly 526 may be directly coupled to the first electric motor 556, and power may be transferred to the first front drum assembly 524 via the first mechanical coupling 564.

Similarly, a second mechanical coupling 566 may be provided between the second front drum assembly 530 and the second rear drum assembly 532. A third mechanical coupling 568 may be provided between the third front drum assembly 536 and the third rear drum assembly 538. Lastly, a fourth mechanical coupling 570 may be provided between the fourth front drum assembly 542 and the fourth rear drum assembly 544.

In the embodiment of FIG. 5, a slip clutch may be provided in order to protect the various row unit components. Here, since only one motor is provided to drive two separate drums, the size of the motor may be greater than that in FIG. 4. With a larger motor producing greater power, a slip clutch may be used as a torque limiter when a row unit is plugged or an overload condition occurs.

In a further embodiment, there may be one electric motor for electrically powering the drums in the first and second picking units, and a second electric motor for electrically powering the drums in the third and fourth picking units. Here, for example, the first electric motor 556 may electrically power the first rear drum 526. The first front drum 524 and first rear drum 526 may be coupled to one another via a mechanical coupling 564, as shown in FIG. 5. Here, however, the second inverter 550 and second electric motor 558 may be removed from the control system. The second front drum 530 and second rear drum 532 may be mechanically coupled to the first front drum 524 or first rear drum 526. Thus, electrical power from the first motor 556 may drive the first front and rear drums and the second front and rear drums. In this embodiment, the same may be true of the third front and rear drums and fourth front and rear drums being powered by either the third motor 560 or fourth motor 562, but not both.

Although not shown, another embodiment of an independent electrically-powered drum system may include a single motor for powering all of the front and rear drums of the cotton harvester row unit. In other words, rather than each picking unit having its own electric motor, in this embodiment there may be only one motor for powering all of the drums. Taking FIG. 5 for example, in this embodiment a single motor would replace the first motor 556, second motor 558, third motor 560, and fourth motor 562. The single motor would electrically power the front and rear drums of the first, second, third and fourth picking units. In this embodiment, there may only be a single inverter for the single motor.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A picking unit of a cotton harvester row unit, comprising:
   a drum rotatable about an axis;
   a plurality of spindles for harvesting cotton, the plurality of spindles coupled to the drum;
   a first drive unit for rotatably driving the plurality of spindles;
   a second drive unit for producing electrical power;
   a drive shaft electrically driven by the second drive unit;
   an output gear coupled to the drive shaft; and
   a drum drive gear coupled to the output gear and rotatably driving the drum, where the output gear operably transfers power from the drive shaft to the drum drive gear;
   wherein, the drum is operably controlled independently of the plurality of spindles;
   further wherein, the second drive unit comprises an inverter and an electric motor, wherein the inverter operably receives an input from the electric motor related to either torque or speed during a picking operation, the inverter operably compares the input to a torque limit threshold or a speed limit threshold, and the inverter detects a plugged or torque overload condition when the input exceeds the torque limit threshold or speed limit threshold.

2. The picking unit of claim 1, further comprising a plurality of doffers rotatably driven by the first drive unit.

3. The picking unit of claim 1, further comprising a second drum rotatable about a second axis and spaced from the first drum, the second drum being rotatably driven by the second drive unit.

4. The picking unit of claim 3, wherein the second drum is mechanically coupled to the first drum.

5. The picking unit of claim 1, further comprising:
   a second drum rotatable about a second axis and spaced from the first drum;
   a third drive unit for producing electrical power;
   a second drive shaft electrically driven by the third drive unit;
   a second output gear coupled to the second drive shaft; and
   a second drum drive gear coupled to the second output gear and rotatably driving the second drum, where the second output gear operably transfers power from the second drive shaft to the second drum drive gear;

wherein, the second drum is operably controlled independently of the plurality of spindles.

* * * * *